United States Patent [19]

Stone

[11] Patent Number: 4,564,275

[45] Date of Patent: Jan. 14, 1986

[54] AUTOMATIC HELIOSTAT TRACK ALIGNMENT METHOD

[75] Inventor: Kenneth W. Stone, Huntington Beach, Calif.

[73] Assignee: McDonnell Douglas Corporation, Long Beach, Calif.

[21] Appl. No.: 623,006

[22] Filed: Jun. 21, 1984

[51] Int. Cl.[4] .................................................. F24J 3/02
[52] U.S. Cl. ...................................... 353/3; 126/425
[58] Field of Search ............................. 353/3; 126/425; 136/248; 364/516; 350/289; 250/203 R

[56] References Cited

U.S. PATENT DOCUMENTS 4,440,150  4/1984  Kaehler ........................... 353/3 X

FOREIGN PATENT DOCUMENTS 1041825  9/1983  U.S.S.R. ............................... 353/3

Primary Examiner—Harry N. Haroian
Attorney, Agent, or Firm—Benjamin Hudson, Jr.; George W. Finch; Donald L. Royer

[57] ABSTRACT

A method of automatically aligning heliostats by comparing the actual sunbeam centroid position on a target to a command reference position to determine the error in the sunbeam centroid location.

The sunbeam centroid position error is then analyzed to correlate the error to errors in the heliostats' track alignment system. New coefficients are established for the heliostats' track alignment system to automatically correct for errors in the system, this eliminates the need for resurveying and field work normally associated with aligning heliostats.

5 Claims, 18 Drawing Figures

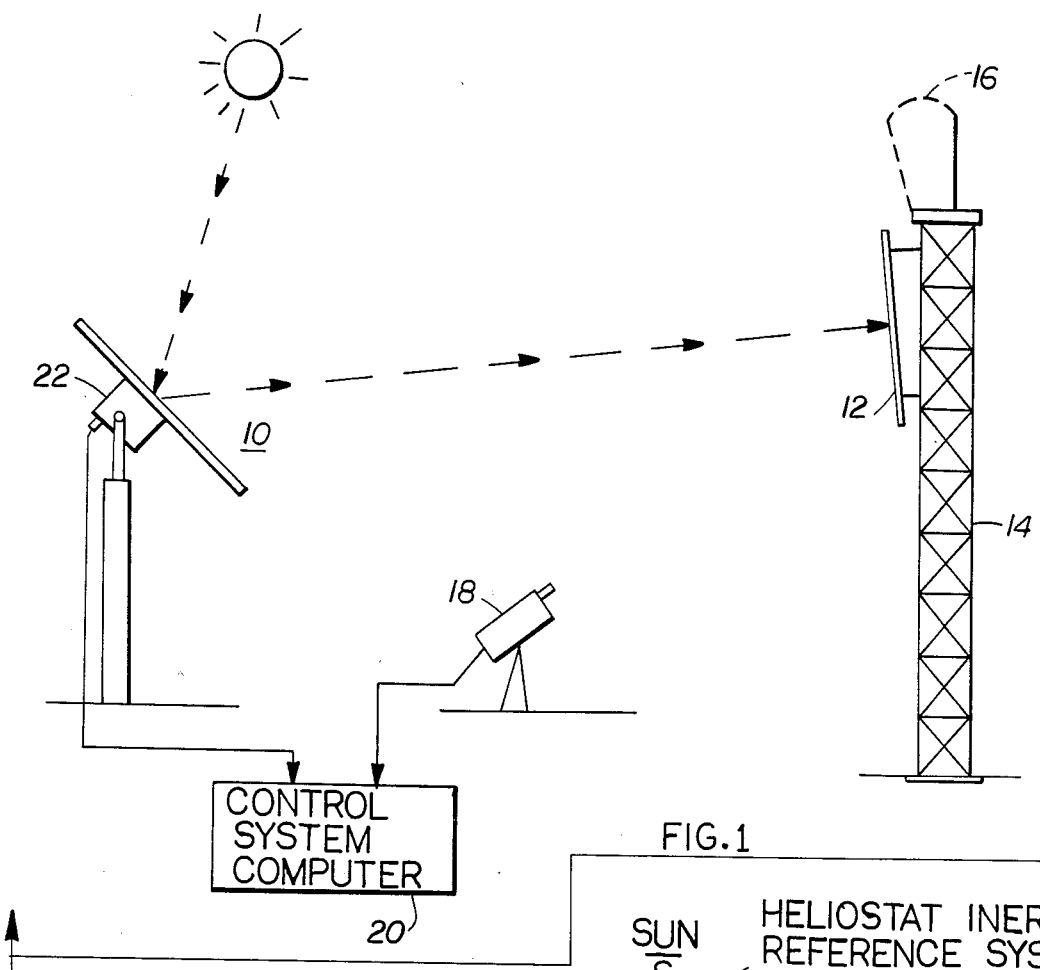
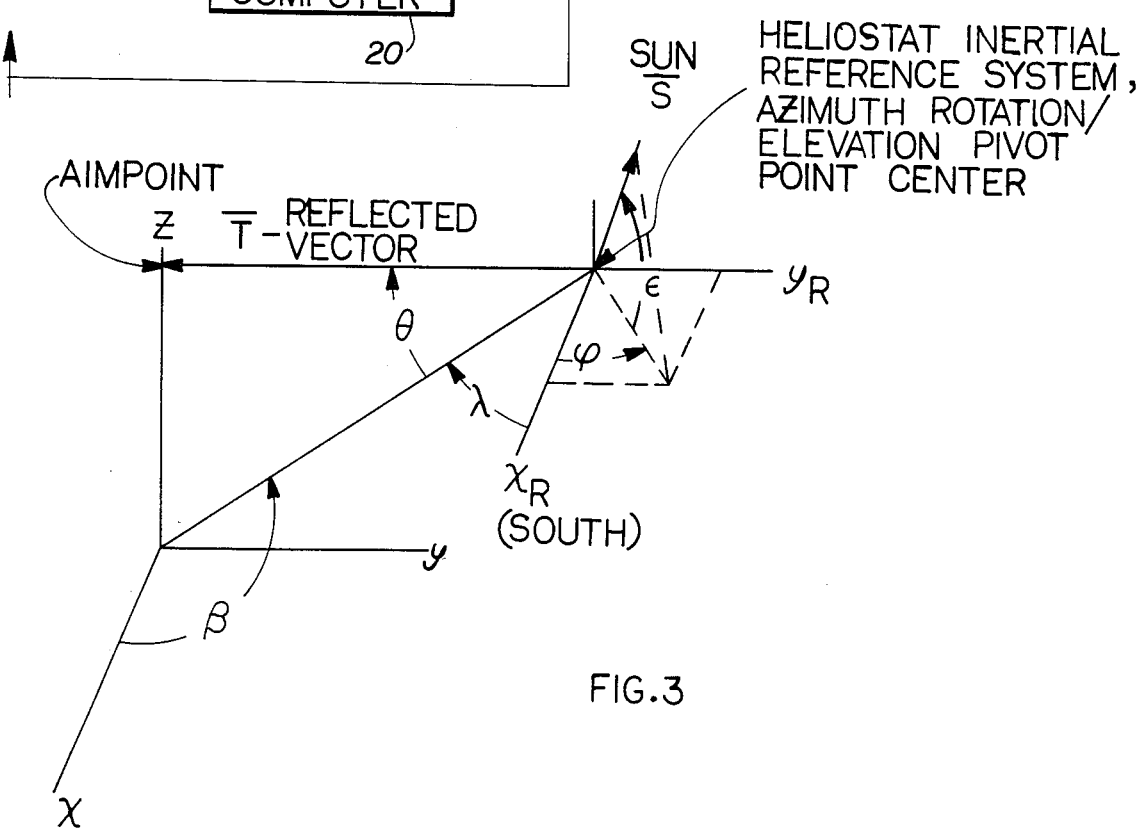
FIG.1
FIG.3

AUTOMATIC HELIOSTAT TRACK ALIGNMENT METHOD

BACKGROUND OF THE INVENTION

1. Field of the Invention

This invention relates generally to control apparatus for delivering solar energy from a heliostatic field to a receiver and, more particularly, to control systems that automatically correct for error between the heliostat's command reference system and its inertial reference system.

2. Description of the Prior Art

In order for a heliostat field to deliver the required sun energy to its receiver, the heliostats require a beam pointing control accuracy of less than 1.5 mr rms over the day. There are many different classes of errors that can result in a beam pointing error. One such class of errors is track alignment error which produces a difference between the inertial reference system and the heliostat command reference system. This error may be produced in the original construction of the foundation, subsequent foundation settling, movement resulting from high winds, earthquakes, etc.

The aimpoint may be altered by improper centering of the foundation. Also, if the foundation, pedestal, and drive are not installed vertically, the heliostat azimuth rotational point at the top of the pedestal will be displaced from the desired aimpoint.

Azimuth rotational axis tilt results from misalignment between the actual azimuth rotational axis and the local vertical. The verticality of the foundation, tilt of the pedestal, or a misalignment of azimuth drive, etc., are some of the things which cause rotational tilt errors.

All position commands for the heliostat are calculated with respect to the local horizontal plane and a south reference line. If the heliostat reference system is not aligned to this system, then a beam error will result.

A number of alignment measuring methods have been investigated and have been proven to be unable to meet the accuracy requirement or were very costly because of extensive field labor required to correct for misalignment in the system. Time consuming methods require resurveying the heliostat site to minimize alignment errors, taking physical heliostat measurements in the field, and making calculations in order to determine the track alignment error source values for a single heliostat. It would be desirable if there were provided an efficient, time and cost saving method in which to set up a heliostat for tracking operations having the additional capability to automatically reset the heliostat track alignment which may change as a result of continuous operation over time.

SUMMARY OF THE INVENTION

There is provided by this invention a heliostat track alignment method that eliminates resurveying and field work and provides a method of aligning a single heliostat or a number of heliostats at the same time. This method corrects heliostat track alignment by comparing the sunbeam centroid position to a reference sunbeam centroid position and analyzes any sunbeam position error to correlate this error to misalignments in the heliostat track alignment system.

BRIEF DESCRIPTION OF THE DRAWINGS

FIG. 1 illustrates apparatus for a heliostat track alignment system incorporating the principles of this invention;

FIG. 3 is a diagram for the heliostat inertial reference system; and

BRIEF DESCRIPTION OF THE PREFERRED EMBODIMENT

Figure 2:
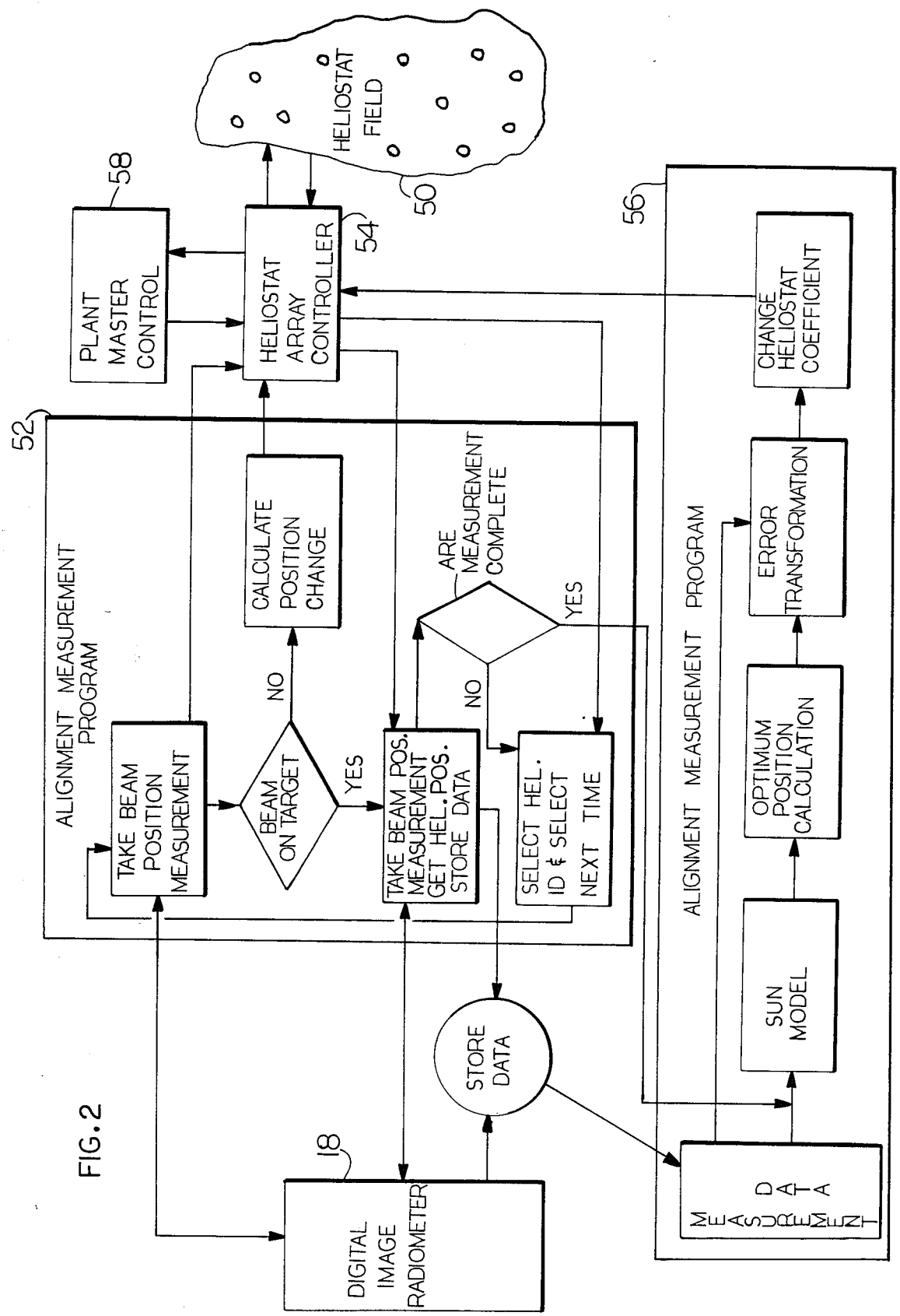
FIG. 2 illustrates a system flow chart for a heliostat field incorporating the principles of this invention.

Referring to FIG. 1, there is shown a heliostat 10 that automatically updates its heliostat tracking aimpoint and monitors its optical performance. The heliostat reflects the sun's rays to a target 12 generally located on the tower 14 beneath the heliostat receiver 16. A digital image radiometer 18 evaluates the heliostat by measuring the total beam power, irradiance distribution, beam centroid, tracking accuracy, and overall mirror reflectivity.

The digital image radiometer herein described is generally of the type described in the copending U.S. Application Ser. No. 33,668 entitled "Digital Image Radiometer", filed on Dec. 23, 1981 and assigned to the assignee of the instant application. In as much as the digital image radiometer is of the type disclosed in the aforementioned Application, to which reference is made for complete description of structure and operation, the description herein is limited to those portions essential to the operation of the present invention. The digital image radiometer 18 may be a video camera similar to a Model 2850C-207 low light television camera manufactured by Cohu, Inc. Electronics Div. The camera is equipped with a silicon diode array video tube and a 10:1 zoom lens. Circuit modifications eliminate the camera's AGC response and a black level mask located at the edge of the image is used as a reference to assure constant black level over a wide temperature range. These modifications allow the camera to operate as a radiometer, with light level controlled by iris settings and filters The camera has a relay lens for the black level mask and space for a variety of filters used to flatten the response of the camera over its spectral response range.

The observed light level monitored by the digital image radiometer is reduced to digitized form employing digitization equipment, not shown, which provides a one to one correspondence of the digital number assigned to the analog signal received from each picture element (pixel) of the radiometer in terms of location and magnitude. This information is used to determine the location of the beam centroid.

The digitizing equipment employed with the radiometer 18 may be a Quantex Model DS-12 Digital Image Memory/Processor. This system accepts the video signal from the camera; converts the signal to digital form; stores the digital data, and transmits the data to a control system computer 20 upon command. Incoming composite video is stripped of sync and applied to a high-speed A/D converter. Data from the A/D passes through the arithmetic processor where it is combined with memory data through handwired arithmetic processes.

A heliostat controller 22 is connected to the heliostat 10 which controls the position of the heliostat upon command from the system computer. A heliostat field controller (not shown) may interface with the system computer and a multitude of heliostats in the field to selectively control each heliostat.

The computer 20 is capable of aligning, monitoring, and evaluating a large number of heliostats in a field. The arrangement shown generally in FIG. 1 is typical of each heliostat in the field. When a heliostat is tested, the control system computer moves the heliostat to change the aimpoint from the receiver to a reference position on the target. As the heliostat is trained on the target, the digital image radiometer is switched to view the beam and the video signal is then digitized and transmitted to the control system computer. The control system computer corrects its aimpoint data and thus maladjustments in the heliostat reference system by correlating the sunbeam centroid errors to errors in the heliostat reference system. A beam centroid error is calculated by taking the difference between the actual centroid and the commanded centroid.

Referring to FIG. 2 a system flow chart is shown for automatically aligning a number of heliostats in a heliostat field 50. An Alignment Measurement Program 52 systematically selects a heliostat such as 10 from the heliostat field 50 for alignment. A heliostat array controller 54 interfaces the individual controllers in the field such as 22, in the system. A master control station 58 provides manual override for the system and allows the operator to be in complete control of the heliostat field. The heliostat selected from the field is identified, the time of day noted, and the computer makes a measurement to check its position using the digital image radiometer 18 as previously described. Each heliostat must have several position measurements made periodically to collect enough data to make the necessary alignment calculations. Three measurements are taken for each heliostat with approximately a two hour interval between the measurements. One measurement may only take a couple of minutes. If the beam is not on the target, a position change is calculated and the heliostat's position is changed to place the beam on the target before measurement is made and another heliostat is selected. The computer selects each heliostat for the first measurement in a first supervision of the field. After the first measurements are made, the measurement process is repeated for the second supervision of the field at a stored time interval for each heliostat. When the last set of measurements are being made, the first heliostat selected has its alignment coefficients checked by the alignment calculation program 56. The Alignment Calculation Program 56 determines a new set of coefficients for the heliostat by analyzing the beam centroid error. The new alignment data is stored and the heliostat array controller 54 then commands the heliostat to its new position by means of its individual controller. The next heliostat is then selected and the last measurement is made, the alignment coefficients checked, and new coefficients are stored and sent to the controller.

In the Alignment Program 56, calculations are made for the sun's position based upon the stored time data when the measurements were made. Such factors as the sun's azimuth and elevation are calculated. This process is represented by the sun model block in the flow chart diagram. The program then calculates the position of the heliostat based upon the sun's position and the command position of the sunbeam. Once the program has calculated the optimum heliostat position, this information is compared with the stored measurements made. In the error transformation routine errors between the command position and the measured positions are used to calculate the alignment error coefficients.

Figure 4:
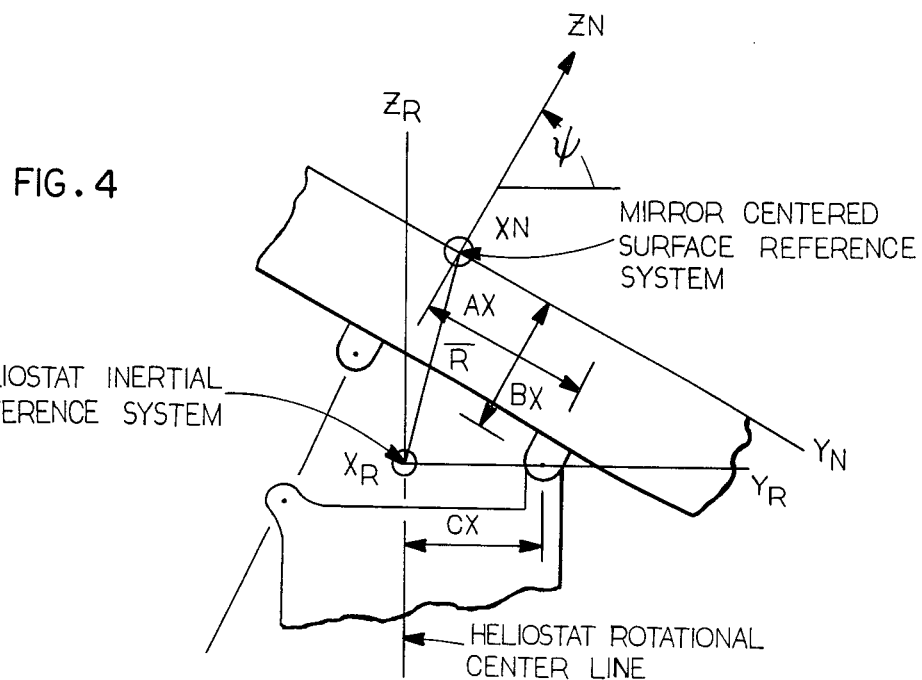
FIG. 4 is a diagram of the heliostat mirror centered reference system.

FIGS. 3 and 4 illustrate the vector information for the heliostat inertial reference system and the mirror centered reference system. By taking a number of digital image radiometer measurements spaced over a day, a set of equations which relates the beam centroid error to the error sources in the heliostat reference system through the heliostat kinematics can be written in the matrix form as follows:

$$\overline{BE} = \overline{FES}$$

where
$\overline{ES}$ = The error sources
$\overline{F}$ = Transfer function
$\overline{BE}$ = Centroid error measurements An estimate of the error source (ES) is:

$$\hat{ES} = \hat{F}^{-1}\overline{BE} \quad \text{where}$$

$$\overline{BE} = \begin{vmatrix} \Delta\theta_1 \\ \Delta\beta_1 \\ \Delta\theta_2 \\ \Delta\beta_2 \\ \Delta\theta_3 \\ \Delta\beta_3 \\ \Delta\theta_4 \\ \Delta\beta_4 \end{vmatrix} \begin{array}{l} \text{Elevation Beam Error Measurement \#1} \\ \text{Azimuth Beam Error Measurement \#1} \\ \text{Elevation Beam Error Measurement \#2} \\ \text{Azimuth Beam Error Measurement \#2} \\ \text{Elevation Beam Error Measurement \#3} \\ \text{Azimuth Beam Error Measurement \#3} \\ \text{Elevation Beam Error Measurement \#4} \\ \text{Azimuth Beam Error Measurement \#4} \end{array}$$

$$\hat{F} = \begin{vmatrix} f_{11}, f_{12}, f_{13}, \ldots f_{18} \\ f_{21}, f_{22}, f \ , \ldots f_{28} \\ \ldots \ldots \ldots \ldots \\ f_{81}, \ldots \ldots \ldots f_{88} \end{vmatrix}$$

$$\hat{ES} = \begin{vmatrix} CE \\ AH \\ BS \\ CR \\ AR \\ BR \\ DT \\ DB \end{vmatrix} \begin{array}{l} \text{Non-Orthogonality - 1st Rotation} \\ \text{Non-Orthoganality - 2nd Rotation} \\ \text{Reference - Elevation} \\ \text{Reference - Azimuth} \\ \text{Azimuth Tilt - 1st Rotation} \\ \text{Azimuth Tilt - 2nd Rotation} \\ \text{Aimpoint - Elevation} \\ \text{Aimpoint - Azimuth} \end{array}$$

Figure 5:
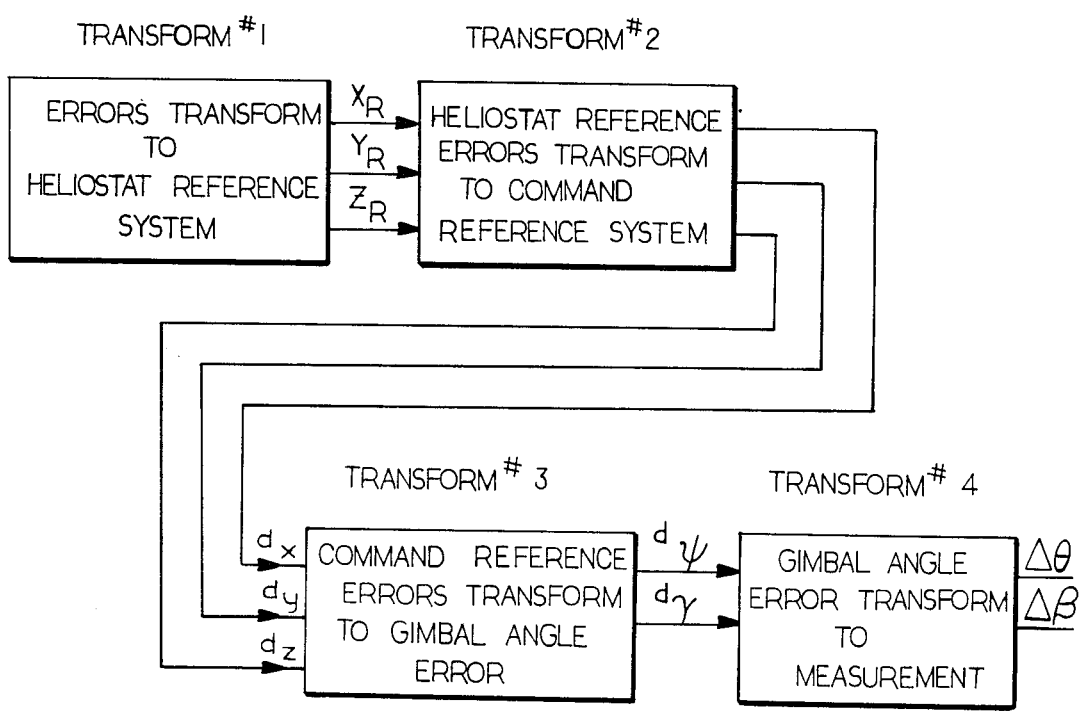
FIG. 5 illustrates a block diagram for the error transfer function model.

The F matrix is the relationship between the error sources and the measurement errors. This matrix is divided into four separate transformations as shown in FIG. 5.

Figure 6:
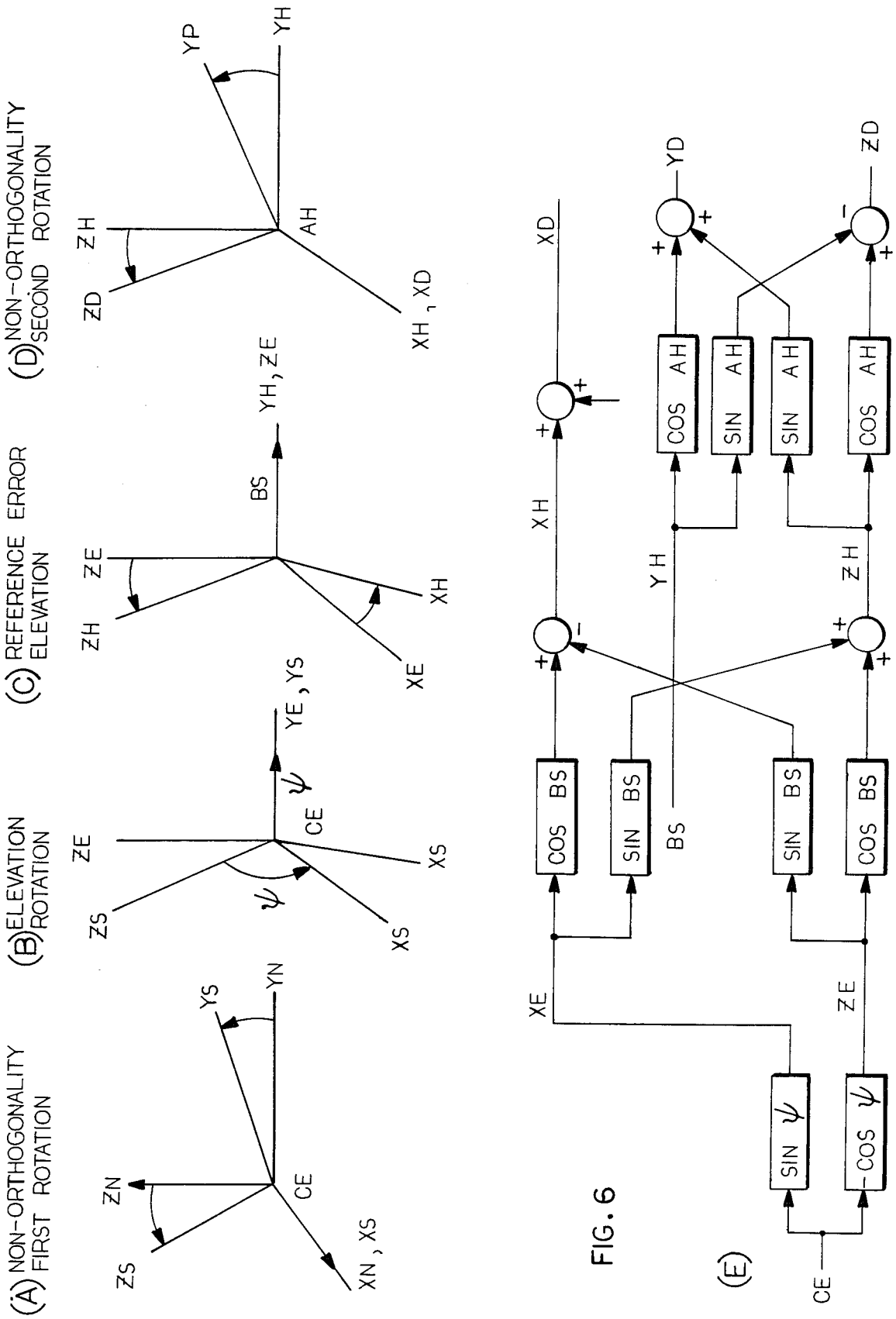
FIGS. 6A–6E illustrate diagrams for error transformation of non-orthogonality in the heliostat reference system.
Figure 7:
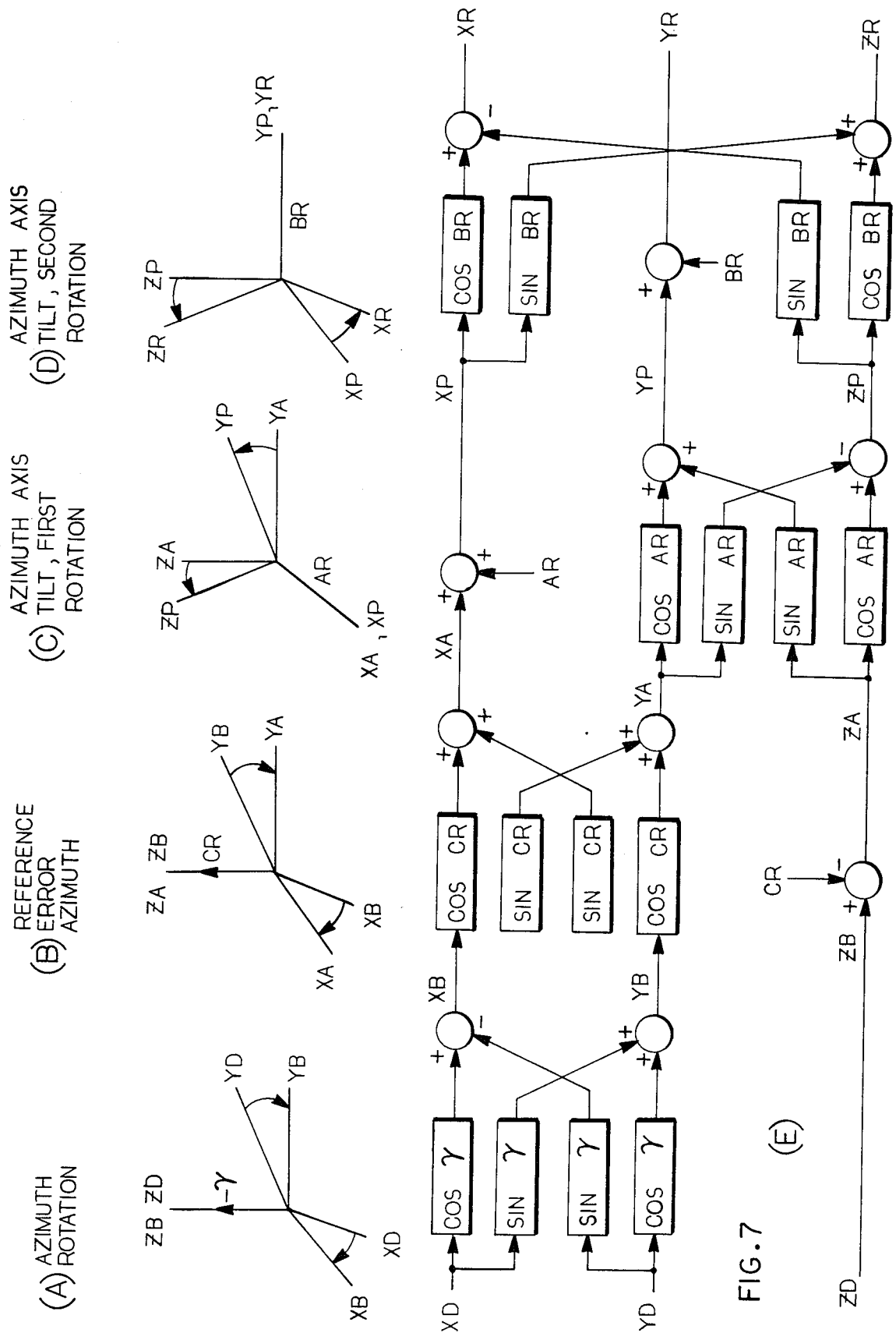
FIGS. 7A–7E illustrate diagrams for error transformation of azimuth in the heliostat reference system.

Transformation #1—The error models for the first transformation are shown in FIGS. 6E and 7E. Referring to FIG. 6A, the equations for the first rotation of non-orthogonality are:

$$\begin{bmatrix} X_E \\ Y_E \\ Z_E \end{bmatrix} = \begin{bmatrix} \sin\psi & 0 & 0 \\ 0 & 0 & 0 \\ -\cos\psi & 0 & 0 \end{bmatrix} \begin{bmatrix} CE \\ 0 \\ 0 \end{bmatrix}$$

Referring to FIGS. 6B and 6C the equations for elevation rotation, including elevation reference error are:

$$\begin{bmatrix} X_H \\ Y_H \\ Z_H \end{bmatrix} = \begin{bmatrix} \cos BS & 0 & -\sin BS \\ 0 & 1 & 0 \\ \sin BS & 0 & \cos BS \end{bmatrix} \begin{bmatrix} X_E \\ Y_E \\ Z_E \end{bmatrix} + \begin{bmatrix} 0 \\ BS \\ 0 \end{bmatrix}$$

Referring to FIG. 6D, the equations for the second rotation of non-orthogonality are:

$$\begin{bmatrix} X_D \\ Y_D \\ Z_D \end{bmatrix} = \begin{bmatrix} 1 & 0 & 0 \\ 0 & \cos AH & \sin AH \\ 0 & -\sin AH & \cos AH \end{bmatrix} \begin{bmatrix} X_H \\ Y_H \\ Z_H \end{bmatrix} + \begin{bmatrix} AH \\ 0 \\ 0 \end{bmatrix}$$

Referring to FIG. 7A, the equations for transforming this error vector through the azimuth angle are:

$$\begin{bmatrix} X_B \\ Y_B \\ Z_B \end{bmatrix} = \begin{bmatrix} \cos\gamma & \sin\gamma & 0 \\ -\sin\gamma & \cos\gamma & 0 \\ 0 & 0 & 1 \end{bmatrix} \begin{bmatrix} X_D \\ Y_D \\ Z_D \end{bmatrix}$$

Referring to FIG. 7B, the equations for azimuth reference error are:

$$\begin{bmatrix} X_A \\ Y_A \\ Z_A \end{bmatrix} = \begin{bmatrix} \cos CR & \sin CR & 0 \\ -\sin CR & \cos CR & 0 \\ 0 & 0 & 1 \end{bmatrix} \begin{bmatrix} X_B \\ Y_B \\ Z_B \end{bmatrix} + \begin{bmatrix} 0 \\ 0 \\ CR \end{bmatrix}$$

Referring to FIG. 7C, the equations for the first azimuth tilt angle are:

$$\begin{bmatrix} X_P \\ Y_P \\ Z_P \end{bmatrix} = \begin{bmatrix} 0 & 1 & 0 \\ \cos AR & 0 & \sin AR \\ -\sin AR & 0 & \cos AR \end{bmatrix} \begin{bmatrix} X_A \\ Y_A \\ Z_A \end{bmatrix} + \begin{bmatrix} AR \\ 0 \\ 0 \end{bmatrix}$$

Referring to FIG. 7D, the equations for the second azimuth tilt angle are:

$$\begin{bmatrix} X_R \\ Y_R \\ Z_R \end{bmatrix} = \begin{bmatrix} \cos BR & 0 & -\sin BR \\ 0 & 1 & 0 \\ \sin BR & 0 & \cos BR \end{bmatrix} \begin{bmatrix} X_P \\ Y_P \\ Z_P \end{bmatrix} + \begin{bmatrix} 0 \\ BR \\ 0 \end{bmatrix}$$

Figure 8:
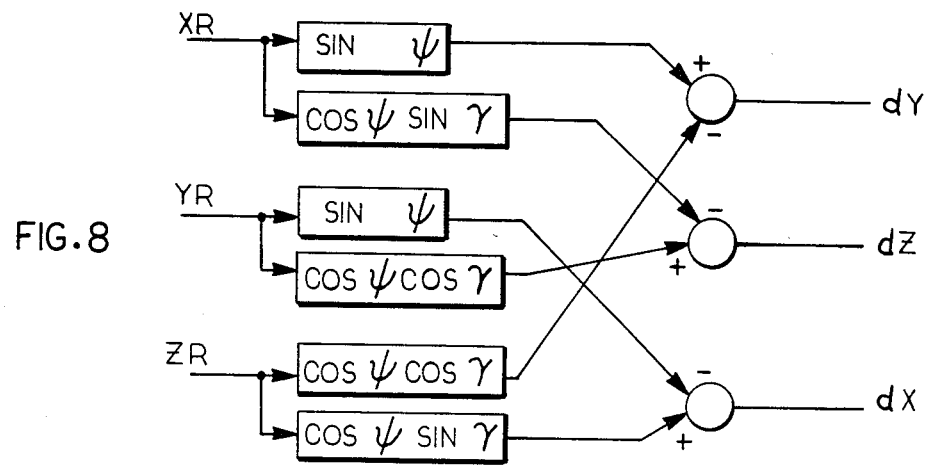
FIG. 8 illustrates a diagram for reference error transformation to differential errors.

Transformation #2—This transformation takes the reference error vector and transforms it to heliostat mirror normal differential errors as shown in FIG. 8. The equations are:

$$\begin{bmatrix} d_x \\ d_y \\ d_z \end{bmatrix} = \begin{bmatrix} 0 & -\sin\psi & \cos\psi \sin\gamma \\ \sin\psi & 0 & -\cos\psi \cos\gamma \\ -\cos\psi \sin\gamma & \cos\psi \cos\gamma & 0 \end{bmatrix} \begin{bmatrix} X_R \\ Y_R \\ Z_R \end{bmatrix}$$

Figure 9:
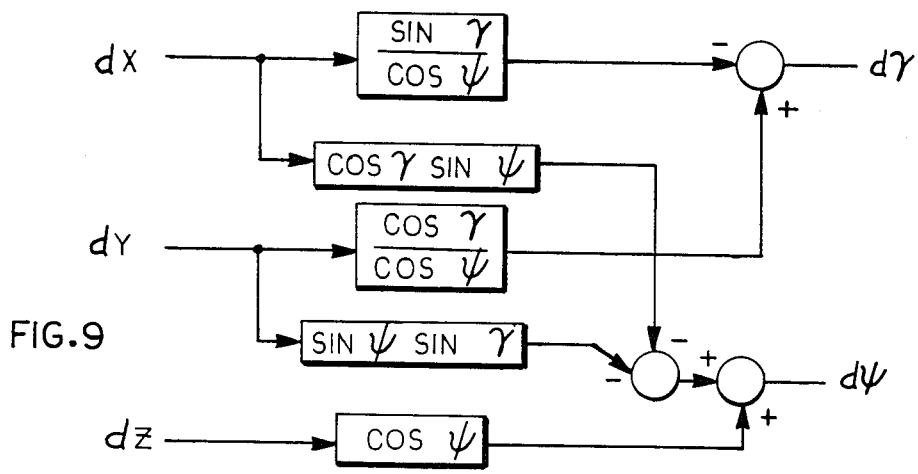
FIG. 9 illustrates a diagram for mirror normal differential error transformation to gimbal angle errors.

Transformation #3—This transformation takes mirror normal differential errors and transforms them to gimbal angle errors as shown in FIG. 9. The equations are:

$$\begin{bmatrix} d_\gamma \\ d_\psi \end{bmatrix} = \begin{bmatrix} \dfrac{-\sin\gamma}{\cos\psi} & \dfrac{\cos\gamma}{\cos\psi} & 0 \\ -\cos\gamma\sin\psi & -\sin\psi\sin\gamma & \cos\psi \end{bmatrix} \begin{bmatrix} d_x \\ d_y \\ d_z \end{bmatrix}$$

Transformation #4—This transformation takes the gimbal angle errors and transforms them to beam errors and adds position errors. The equations for this transformation are:

$$\Delta\theta = \frac{\alpha\theta}{\alpha\psi} d\psi + \frac{\alpha\theta}{\alpha\gamma} d\gamma + DT$$

$$\Delta\beta = \frac{\alpha\beta}{\alpha\psi} d\psi + \frac{\alpha\beta}{\alpha\gamma} d\gamma + DB$$

where:

$$\frac{\alpha\theta}{\alpha\psi} = \frac{2[\sin\epsilon \sin 2\psi + \cos 2\psi \cos\epsilon \cos(\gamma - \alpha)]}{\cos\theta}$$

$$\frac{\alpha\theta}{\alpha\gamma} = \frac{-\sin 2\psi \sin(\gamma - \alpha) \cos\epsilon}{\cos\theta}$$

$$\frac{\alpha\beta}{\alpha\psi} = \{2\cos^2\beta[\cos\epsilon \sin(\gamma - \alpha)][\sin\epsilon \cos 2\psi -$$

$$\sin 2\psi \cos\epsilon \cos(\gamma - \alpha)]\}/V^2$$

$$\frac{\alpha\beta}{\alpha\gamma} = \{\cos^2\beta[\sin\epsilon \sin 2\psi +$$

$$\cos 2\psi \cos\epsilon \cos(\gamma - \alpha)][\sin\epsilon \sin 2\psi +$$

$$2\cos^2\psi\cos\epsilon \cos(\gamma - \alpha)] + 2\cos^2\psi \cos^2\epsilon \sin^2(\gamma - \alpha)\}/V^2$$

$V = \cos\epsilon \cos\alpha + 2\cos\gamma \sin\psi \cos\psi \sin\epsilon + 2\cos^2\psi \cos\gamma \cos\epsilon \cos(\gamma - \alpha)$ DT = Elevation position error
DB = Azimuth position error Once the error sources have been determined, the heliostat control software can be used to correct for them. This is accomplished in different ways. The aim-point errors are corrected by changing the data base stored values.

The reference errors are corrected by changing the data base stored values. When a reference update is done using the new coefficients, the reference position will be corrected.

Figure 10:
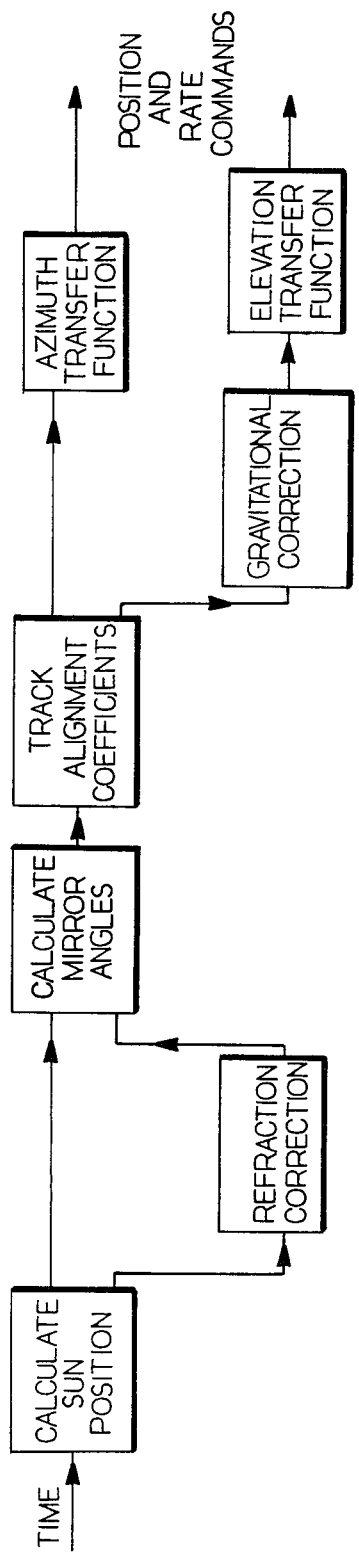
FIG. 10 illustrates a flow chart of the control software for tilt and non-orthogonality error correction.

The tilt and non-orthogonality errors are corrected by the open loop control software as shown in FIG. 10. After the gimbal angles have been calculated, they are rotated to the tilt plane and non-orthogonality plane to obtain the gimbal angles the heliostat will be commanded to. The equations defining the rotation are:

$d\psi = \{\sin^{-1}[\sin\psi \cos AR + \cos\psi \sin\gamma \sin AR] - \psi\} +$ $\{\sin^{-1}[\sin\psi \cos BR - \cos\psi \cos\gamma \sin BR] - \psi\} +$ $\sin^{-1}[\sin\psi/\cos AH] - \psi + \{\sin^{-1}[\sin\psi/\cos CE] - \psi\}$ $d\gamma = \{-\sin^{-1}[\sin CE/\cos\psi]\} -$ $\{\sin^{-1}[\sin(\psi + DS)\sin AH/\cos\psi]\} +$ $\cos^{-1}[\cos\psi\cos\gamma/\cos(\psi + DARS)] +$ $\{\sin^{-1}[\cos\psi/\cos(\psi + DARS)\sin\gamma]\}$ where: DS, DARS and DBRS are elevation error terms. The following program is typical of a program that may be used to solve the equations and implement the steps of the Alignment Calculation Program 56:

```
1      The tilt and non-orthogonality errors are corrected by
       the open loop control software as shown in FIG. 10.  After
       the gimbal angles have been calculated, they are rotated
       to the tilt plane and non-orthogonality plane to obtain
5      the gimbal angles the heliostat will be commanded to.  The
       equations defining the rotation are:
```

$$d\psi = \{\sin^{-1}[\sin\psi \cos AR + \cos\psi \sin\gamma \sin AR] - \psi\}$$
$$+ \{\sin^{-1}[\sin\psi \cos BR - \cos\psi \cos\gamma \sin BR]$$
$$- \psi\} + \sin^{-1}[\sin\psi/\cos AH] - \psi + \{\sin^{-1}$$
$$[\sin\psi/\cos CE] - \psi\}$$

$$d\gamma = \{-\sin^{-1}[\sin CE/\cos\psi]\} - \{\sin^{-1}[\sin(\psi + DS)$$
$$\sin AH/\cos\psi]\} +$$
$$\cos^{-1}[\cos\psi \cos\gamma/\cos(\psi + DARS)]\} +$$
$$\{\sin^{-1}[\cos\psi/\cos(\psi + DARS)\sin\gamma]\}$$

```
       where:

20          DS, DARS and DBRS are elevation error terms.
       The following program is typical of a program that may
       be used to solve the equations and implement the steps of
       the Alignment Calculation Program 56:
            THIS PROGRAM CALCULATES THE BEAM ERROR FOR DIFFERENT
25     ALIGNMENT ERRORS USING THREE DIFFERENT BEAM ERROR MODELS.
            1.   BEAM-    BEAM ERROR MODEL
            2.   ALGS-    REAL WORLD BEAM ERROR MODEL
            3.   ALGM-    ALIGNMENT ERROR MODEL
       VARIABLES:
30          BER(I,J,K) - BEAM ERROR FOR TIME I AND MODEL
            J (1=BEAM, 2=ALGS, 3=ALIGM) AND AXIS K (1=AZIMUTH,
            2=ELEVATION)
```

```
1     DOUBLE PRECISION GAM,SIC,THA,BET,ELP,ALP
     1,AZ,BZ,ARZ,CZ,BRZ,DZ,EZ,FZ,BSX,CRX,ARX,BRX,AHX
     3,CA,CEE,D12,AZIM,ELER,RANGE,XX

5     INTEGER*2 IANS

DIMENSION RNAP(14,2)BER(10,3,2), GRANGE(14)
      COMMON /AIMP/ CA,CEE,RANGE
      COMMON /PRINT/ IPR(20), ICF(3)
10    COMMON /ERROR/ XX(10
      DATA ICF/0,0,0/

GROUND RANGE IN FEET

15    DATA GRANGE /
      1 4797., 3347., 2398., 1450., 446., 460., 3626., 2774.
      2,2012., 1923., 4690., 4217., 3679., 2996./

AZIMUTH AIMPOINT
20
      DATA RNAP /
      1 3.1416, 3.1416, 3.1416, 3.1416, 3.1416, 1.8158,
            2.7468, 2.6150
      2,2.3758, 1.3865, 2.6726, 2.4875, 2.2811, 2.0761
25    3,0.1474, 0.2096, 0.2886, 0.4564, 1.0117, 0.9972,
            0.1939, 0.2512
      4,0.3401, 0.3546, 0.1507, 0.1673, 0.1912, 0.2333

YEAR /    MONTH    /    DAY  /START TI./TIME
30          INC./HEL ID
      DATA IYEAR/1984/, MONTH/ /, IDAY/  /,TIMO/14./,
      DTIM/2.0/,IHEL/1/
            ERROR COR. / LOOPS
      DATA ICOR/0/    , IEM/2/
```

```
       CALL ASNLUN( 1, 'TI', 0)
       CALL ASNLUN( 3, 'LP', 0)
       CALL ASNLUN( 6, 'LP', 0)

SET AIMPOINTS

****** AZIMUTH
       CA        = RNAP(IHEL,1)
      ****** ELEVATION
       CEE       = RNAP(IHEL,2)
      ****** RANGE
       RANGE     = GRANGE(IHEL)

DO 1 I    + 1,8
     1 XX(I)     = 0.0
   100 WRITE(1,1000)
  1000 FORMAT(//'MAKE CHANGES TO:'/'   1. PRINT DEVICE'/'
  2. HEL.AT ID/
      1/'   3. START TIME '/'  4.  PRINT FLAGS'/'
             5. # OF LOOP'
      2/'   6. ALIG. ERRORS'/' 7.  RUN PROGRAM'/'  8. MAKE
  ERROR COR.'
      3/'   9. STOP'/'  10. CONFIGURATION')
       READ(1,1006)  IAN
       GOTO(120,130,160,180,200,220,600,240,
       900,260),IAN

CHANGE PRINT DEVICE

120 WRITE(1,1311)
  1311 FORMAT(//' DOES THE OPERATOR WISH THE PROGRAM'
      1     ,' OUTPUT TO PRINT',/' TO THE CONSOLE"
      2     ,' [TI] OR LINE PRINTER [LP]?'
       READ(1,1035)  IANS
  1034 FORMAT( A2 )
```

```
        IF ( (IANS .NE. 2HTI) .AND.  (IANS .NE. 2HLP))
     GO TO 120
       CALL ASNLUN( 3, IANS, 0 )
         CALL ASNLUN( 6, IANS, 0 )
     GO TO 100

SELECT HELIOSTAT ID

140 WRITE(1.1003)
    1003 FORMAT (//' FOR WHICH HELIOSTAT DOES THE OPERATOR WISH',
         1       ' TO DETERMINE ERROR SOURCE',/' VALUES (TYPE ''1''',
         2       ' OR ''2'') ?')
          READ(1,1006) IHEL
    1006 FORMAT( 3I7 )
         IF(IHEL .GT. 14
     GO TO 140
****** AZIMUTH
         CA   = RNAP(IHEL,1)
****** ELEVATION
         CEE  = RNAP(IHEL,2)
****** RANGE
         RANGE    = GRANGE(IHEL)
     GO TO 100
****** CHANGE START TIME
     160 WRITE(1,1520)
    1520 FORMAT(/' ENTER START TIME ')
         READ(1,1036) TIMO
    1036 FORMAT( F12.6 )
     GO TO 100
****** CHANGE PRINT FLAGS
     180 DO 1550 IX=1,20
    1550 IPR(IX) = 0
    1560 WRITE(1,1500)
```

```
1    1500 FORMAT(//' CHANGE PRINT FLAG(Y/N)?')
          READ(1,1035) IANS
          IF(IANS .NE. 2HY )
     GO TO 100
5         WRITE(1,1511)
          IPR(1),IPR(2),IPR(3),IPR(4),IPR(5),IPR(6)
     1511 FORMAT(/' 1. MAIN= /I2,' 2.ALGS= ',I2,' 3.SUN= ',I2
        1,' 4. BEAM= ',I2,' 5. PCOM= ',I2,' 6. ALGM= ',I2)
          READ(1,1006) IXX
10        IPR(IXX) = 1
     GO TO 1560
               NUMBER OF LOOPS
      200 WRITE(1,1512)
     1512 FORMAT(/' INPUT * OF LOOP EST.')
15        READ(1,1006) IEM
     GO TO 100

CHANGE ERROR SOURCES 20    220 WRITE(1,1600)
     1600 FORMAT(//' DOES THE OPERATOR WISH TO SET ANY OF
          THE'
          1    ,' CE,BS,AH,CR,BR,AR,DB,DT ERROR VALUES?')
          READ(1,1035) IANS
25        IF   (IANS .NE. 2HY )
     GO TO 100
      304 WRITE(1,1610)
     1610 FORMAT(/' INPUT WHICH ERROR NUMBER
              (CE=1,BS=2,ETC..):')
30        READ(1,1006) IERNO
          IF  (IERNO  .GT. 8) GOTO 304
          WRITE(1.1620)
     1620 FORMAT(/' INPUT THE ERROR VALUE DESIRED:')
          READ(1,1013) XX(IERNO)
35   1013 FORMAT( F14.0 )
     GO TO 220
```

```
  240 WRITE(1,1630)
 1630 FORMAT(/' CHANGE ERROR CORRECTION FLAG,
              0(NO COR) OR 1 (MAKE COR)')
      READ(1,1035   ICOR
      GO TO 100

****** Configuration change, gravity, pivot point
       offset.
  260 WRITE(1,1640)
 1640 FORMAT(/'1.GRAV(,0=Y,1=N) 2.TYPE OFSET(0=HFC,1=EX)'
     1,' 3.OFFSET(0=Y,1=N)')
      READ(1,1006) ICX
      WRITE(1,1650)
 1650 FORMAT(/' VALUE OF' )
      READ(1,1006) ICF(ICX)
      GO TO 100
  600 CALL DBDAT (ICOR)
      CALL CXCY(IYEAR,MONTH,IDAY)
      WRITE(3,1040) CA,CEE,ICOR,ICF
 1040 FORMAT(1H,5X, 'BEAM AIMPOINTS '/1H ,2X,
             'AXIMUTH= ',F9.5
     1/1H ,2X, 'ELEVATION=',F9.5/1H ,'SOFTWARE CORRECTION
     FLAG=',I4
     1/1H ,'GRAVITY CORRECTION FLAG(0=GRAVITY,1=NO
             GRAVITY)=I4,
     1/1H ,'OFFSET FLAG(ICF(2)=0-HFC CODE,=1-EXACT), I4
     1/1H ,'OFFSET FLAG(ICF(3)=0-OFFSET,=1-NO OFFSET)
             ',I4 )
      WRITE(3,1050 (XX(I),XX(I+4),I=1,4)
 1050 FORMAT(1H ,/ ' CE-MIRROR SUPPORT ALIGNMENT
              ERROR',F8.4
     1,10X, 'AR-FIRST TILT PLANT ROTATION.....',F8.4
     2,1H , 'BS-ELEVATION REFERENCE ERROR.....',F8.4
     3,10X, 'BR-SECOND TILT PLANE ROTATION....',F8.4
     4,/1H, 'AH-AZIMUTH DR.PIVOT POINT ALIG.ER',F8.4
```

```
     5,10X, 'DB-AZIMUTH POSITION LOCATION ER..',F8.4
     6,/1H, 'CR-AZIMUTH REFERENCE ERROR.......',F8.4
     7,10X, 'DT-ELEVATION BEAM POSITION ERROR.',F8.4

BEGINNING OF TIME LOOP

TIME  = TIMO
       DO 800 I=1,IEM
------ CALCULATE SUN POSITION ------
       CALL SPOS(TIME,ELP,ALP)
------ CALCULATE GIMBAL ANGLES ------
       CALL PCOM(ALP , ELP ,GAM,SIC)

CALL BEAM(ALP,ELP,GAM,SIC, AZID,ELVD,BER
             (I,1,2),BER(I,1,1))

CALCULATE BEAM ERROR FROM ALGS

IFR      =0
       CALL
    ALGS(ELP,ALP,SIC,GAM,THA,BET,BER(I,2,2)BER(I,2,1),IFR)
       IFR      =1
       CALL ALGS(ELP,ALP,SIC,GAM,THA,BET,BER(I,2,2),
                BER(I,2,1),IFR)

CALCULATE BEAM ERROR FROM ALIGM

CALL ALIGM(ELP,ALP,SIC,GAM,BER(I,3,2),
                BER(I,3,1))

800 TIME      = TIME + DTIM
       T         = TIMO
       WRITE(3,1020)
  1020 FORMAT (1H ,3X' TIME ',12X,' AZIMUTH ',50X,'
                ELEVATION '
```

```
        1      1/1H ,14X,' BEAM ',6X,' ALGS ',6X,' ALGM ',6X,
                  'AZ M ER'
               2   , 17X,' BEAM ',6X,' ALGS ',6X,' ALGM ',6X,
                  'EL M ER
        5        DO 850 I  =1,IEM
                 AZMER    = (BER(I,2,1) - BER(I,3,1) ) * 1000.0
                 ELMER    = (BER(I,2,2) - BER(I,3,2) ) * 1000.0
                 WRITE(3,1010)
              T,(BER(I,J,1),J=1,3),AZMER,(BER(I,J,2),J=1,3),ELMER
       10  1010  FORMAT(1H ,F8.2,1X,4F12.8,14X,4F12.8 )
            850  T          = T + DTIM
              TO TO 100
                900  END

15        SUBROUTINE PCOM(AZIM,ELER,GAMC1,SIC2)

SUBROUTINE PCOM

THIS ROUTINE CALCULATES THE HELIOSTAT GIMBAL
       20        ANGLES WHICH WILL REFLECT THE BEAM AT THE DESIRED
                 AIMPOINT.
                      INPUTS:
                           AZIM - SUN AZIMUTH ANGLE (RADS)
                           ELER - SUN ELEVATION ANGLE (RADS)
       25             OUTPUTS:
                           GAMC1 - HELIOSTAT AZIMUTH GIMBAL
                                   ANGLE (RADS)

IMPLICIT DOUBLE PRECISION (A-H,O-Z)
       30        REAL NE,NUCA,NUCE,NA,NER,NAR
                 REAL*8 TEMP,COSIC
              COMMON/DBCAL2/C5,C6,C7,C8,C9,D1,C10,D4,D5,D6,D7,D8,D9,
                    D10,D11,D12
                  1,D13,C11
       35        COMMON /DBFIX2/A14,E1,E2,E3,E4,E5,E6,E7,F1,F2,
                       F3,F4,F5,PI
```

```
        COMMON /DBFIX4/ A21,A22,A23,A24
        COMMON /AIMP/ CA,CEE,GRANGE
        COMMON /PRINT/IPR(20),ICF(3)
        COMMON /HEL/ AX,BX,CX,AX1,BX1,CX1
        IF( IPR(5) .GT. 0.0 ) WRITE(3,1010)
            CA,CEE,GRANGE
    1010 FORMAT(1H0,'****** PCOM ' /1H , 'AIMPOINT
            (CA,CEE,GRANGE) ',3E10.4)
                CALCULATE GIMBAL ANGLE FOR HELIOSTAT
                INCLUDES PIVOT POINT OFFSET
        NUM     = 0
        DCE     = 0.0
        DCA     = 0.0
        IF( ICF(2) .GT. 0 )
    GO TO 100
      66 TOP    = DCOS(CEE-DCE)*DSIN(CA-DCA)
         BOT    = DCOS(CEE-DCE)*DCOS(CA-DCA)
         PHI    = DARCOS(DSIN(CEE-DCE)*DSIN(ELER)-
                 DCOS(CEE-DCE)*
       1                DCOS(ELER)*DCOS(CA-DCA-AZIM))
         SIC    =
    DARSIN((DSIN(ELER)+DSIN(CEE-DCE))/2./DCOS(PHI/2.))
         GAMC1  = DATAN2(DCOS(ELER)*DSIN(AZIM)-
                 TOP,DCOS(ELER)
       1                *DCOS(AZIM)-BOT)
        IF( IPR(5) .GT. 0)WRITE(6,3000)GAMC1,
            SIC,CA,CEE,DCA,DCE
    3000 FORMAT(' GAMC1='F14.8,' SIC"F14.8,' C5',F14.8
       1 ,' C6',F16.8,'DCA',F8.4,'DCE',F8.4 )
         RX     = (CX1+BX1*DCOS(SIC)-AX1*DSIN(SIC))
                 *DCOS(GAMC1)
         RY     = (CX1+BX1*DCOS(SIC)-AX1*DSIN(SIC)
                 *DSIN(GAMC1)
         RZ     = BX1*(DSIN(SIC)-1.)
         DCA    = (DCOS(CA)*RY-DSIN(CA)*RX)/GRANGE
```

```
      DCE       = DCOS(CEE)**2*(RZ+DSIN(CEE)*DCOS(CEE)
                  *(DCOS(CA)*RX
     1            +DSIN(CA)*RY))/GRANGE
      IF(IPR(5),GT.0)WRITE(6,3010)
          CA,CEE,DCA,DEC,RX,RY,RZ
 3010 FORMAT (1H ,'CA,CEE,DCA,DCE,RX,RY,RZ=',7F14.8)
      NUM=NUM+1
      IF (NUM.LE.1)
   GO TO 66
          SIC1 = SIC
   GO TO 200
    100 TOP       = DCOS(CEE-DCE)*DSIN(CA-DCA)
        BOT       = DCOS(CEE-DCE)*DCOS(CA-DCA)
        PHI       = DARCOS(DSIN(CEE-DCE)*DSIN(ELER)-DCOS
                    (CEE-DCE)*
     1              DCOS(ELER)*DCOS(CA-DCA-AZIM))
        SIC       = DARSIN((DSIN(ELER)+DSIN(CEE-DCE))
                    /2./DCOS(PHI/2.))
        GAMC1     = DATAN2(DCOS(ELER)*DSIN(AZIM)-TOP,
                    DCOS(ELER)
     1              *DCOS(AXIM)-BOT)
      IF( IPR(5) .GT. 0 )WRITE(6,3000)GAMC1,SIC,CA,CEE,
          DCA,DCE
        RR        = CX1 + BX1*DCOS(SIC) - AX1IDSIN(SIC)
        GRC       = GRANGE + RR*DCOS(CA-GAMC1)
        DOF       = RR*DSIN(CA-GAMC1
        DCA       = DATAN2(DOF,GRC)
        GR        = GRC/DCOS(DCA)
        RZ        = BX1*(DSIN(SIC)-1.0)+AX1*DCOS(SIC)
        CEP       = DATAN2( -RZ + GRANGE*TAN(CEE) , GR )
        DCE       = CEE - CEP
      IF(IPR(5) .GT.0)WRITE(6,3012) DCA,DCE,RR,GRC,DOF,
          GR,RZ,CEP
```

```
      3012 FORMAT(1H ,'DCA,DCE,RR,GRC,DOF,GR,RZ,CEP',8E12.4)
           NUM=NUM+1
           IF( NUM .LE. 1 )
      GO TO 100
           SIC1 = SIC
       200 G = ((((E6*SIC+SIC+E5)*SIC+E4)*SIC+E3*SIC+E2)*SIC+E1
           IF( ICF(1) .GT. 0 ) G = 0.0D0
           SIC2 = SIC1 - G
           IF(IPR(5).GT.0)WRITE(6,1000) GAMC1,SIC1,SIC2,G
      1000 FORMAT(1H ,'GAMC1' F10.6' SIC1 =
                  'F10.6' ISC2'F10.6' G'F10.6)
           RETURN
           END

SUBROUTINE BEAM (SNAZ,SNEL,GAM,PSI, AZID,ELVD,
                           EREB,ERAB)

THIS ROUTINE CALCULATES THE REFLECTED BEAM
           POSITION AND ERROR BETWEEN THE REFLECTED BEAM AND
           AIMPOINT.

INPUTS:
              SNAZ   - SUN AXIMUTH (RADS)
              SNEL   - SUN ELEVATION (RADS)
              GAM    - HELIOSTAT AZIMUTH GIMBAL ANGLE (RADS)
              PSI    - HELIOSTAT ELEVATION GIMBAL ANGLE (RADS)

OUTPUTS:
              AZID   - BEAM AZIMUTH DIRECTION (HELIOSTAT REF)
              ELVD   - BEAM ELEVATION DIRECTION (HELIOSTAT REF)
              ERAB   - AZIMUTH BEAM ERROR (RADS)
              ERAB   - ELEVATION BEAM ERROR (RADS)

IMPLICIT DOUBLE PRECISION (A-H,O-Z)
```

```
      COMMON/DBFIX2/A14,E1,E2,E3,E4,E5,E6,E7,F1,F2,F3,F4,
             F5,PIX
      COMMON /AIMP/ CA,CEE,GRANGE
      COMMON /HEL/ AX,BX,CX,AX1,BX1,CX1
      COMMON/ERROR/XX(10)
      COMMON/D123/D1,D2,D3
      COMMON /PRINT/ IPR(20),ICF(3)
      DATA PI/3.141592654D0/
      IF( IPR(4) "GT. 0 ) WRITE(3,1000) CA,CEE,GRANGE

1000 FORMAT(1H ,'****** BEAM "/1H,"AIMPOINTS
     CA,CEE,GRANRE    1,2F10.4,2X,F10.3 )
      FIND MIRROR NORMAL IN INERTIAL XP,YP,ZP
      (SOUTH EAST UP)
      D4       = DCOS(D1)
      D5       = DSIN(D1)
      D7       = DCOS(D2)
      D10      = DSIN(D2)*SIN(D1)
      D11      = DSIN(D2*DCOS(D1)
      D12      = DCOS(D3)
      IF( IPR(4) .GT. 0 ) WRITE(3,1030) D1,D2,D3,D4,
             D5,D7,D10,D11,D12
 1030 FORMAT(1H ,'D1,D2,D3,D4,D5,D7,D10,D11, D12',
             10F9.5 )
      ALF1     = D4*D4_D7*D5*D5
      ALF2     = (1.0D0-D7)*D5*D4
      ALF3     = D5*D5_D7*D4*D4
      DSD      = DSIN(D3)
      CGAMC2   = DCOS(GAM)
      SGAMC2   = DSIN(GAM)
      G        = ((((E6*PSI+E5)*PSI+E4)*PSI+E3)
                 *PSIE2)*PSI+E1
      IF( ICF(1) .GT. 0 ) G = 0.0
      IF( IPR(4) .GT. 0)WRITE(3,1040)ALF1,ALF2,ALF3,
             DSD,CGAMC2, SGAMC2,G
```

```
1040 FORMAT(1H ,'ALF1,2,3',3F8.5,'DSD',F8.5,
     'C&SGAMC2',2F8.5,'G',F9.6)
      PSIG      = PSI+G
      CSIC3     = DCOS(PSIG)
      EGA       = DSIN(PSIG)
      GCC1      = CGAMC2*CSIC3+SGAMC2*EGA*DSD
      GCC2      = SGAMC2*CSIC3-CGAMC2*EGA*DSD
      GCC3      = EGA*D12
      XP1       = ALF1*GCC1+ALF2*GCC2+D10*GCC3
      YP1       = ALF2*GCC1+ALF3*GCC2=D11*GCC3
      ZP1       = -D10*GCC1+D11*GCC2+D7*GCC3

HELIOSTAT NORMAL UNIT VECTOR

XMAG      = DSQRT(XP1*XP1 + YP1*YP1 + ZP*ZP1)
      XP1       = XP1/XMAG
      YP1       = YP1/XMAG
      ZP1       = ZP1/XMAG
      IF( IPR(4) "GT. ) ) WRITE(3,1010) XP1,YP1,ZP1
1010  FORMAT(1H ,' XP1,YP1,ZP1 ',3F10.5 )

CALCULATE SUN DIRECTION IN ZP,YP,ZP
(SOUTH,EAST UP) CO-OR

SX        = DCOS(SNEL)*DCOS(SANZ)
      SY        = DCOS(SNEL)*DSIN(SNAZ)
      SZ        = DSIN(SNEL)

CALCULATE THE ANGLE BETWEEN THE SUN AND THE
REFLECTED BEAM

TCOS2=2.0*(SX*XP1+SY*YP1+SZ*ZP1)

CALCULATE REFLECTED BEAM FROM HELIOSTAT
```

COMPUTE SLANT RANGE

```
            SNDZP       = -SZ +TCOS2*ZP1
            ELBEAM      = DARSIN(SNDZP)
            SRANGE      = GRANGE/DCOS(ELBEAM)
      IF( IPR(4) .GT. 0 ) WRITE(3,1050)
            TCOS2,SNDZP,ELBEAM,SRANGE
 1050 FORMAT(1H ,'TCOS',F12.6,'SND',F12.8,'ELBEAM",
            F12.8,'SRANGE',F12.4)
            SNDX        = (=SX+TCOS2*XP1)*SRANGE
            SNDY        = (-SY+TCOS2*YP1)*SRANGE
            SNDZ        = (=SZ+TCOS2*ZP1)*SRANGE
```

COMPUTE VECTOR FROM MORROR SURFACE AT ASSUMED MIRROR CENTER OF ROTATIONS TO THE ACTUAL CENTER OF MIRROR MODULE AT THE CALCULATED PSI AND GAMMA

```
            RX    = (CX+BY*DCOS(PSIG)-AX*DSIN(PSIG))
                        *DCOS(GAM)
            RY    = (CX+BX*DCOS(PSIG)-AX*DSIN(PSIG))
                        *DSIN(GAM)
            RZ    = BX*(DSIN(PSIG)-1.) + AX*DCOS(PSIG)
```

WHERE A=THE ASSUMED CENTER OF ROTATION RELATIVE TO THE AZIMUTH AXIS AND THE MIRROR SURFACE
B=THE ACTUAL CENTER OF THE MIRROR MODULE AT THE MIRROR SURFACE RELATIVE TO THE AZIMUTH AXIS
C=THE PERPENDICULAR FROM THE AZIMUTH AXIS TO THE ELEVATION AXIS

```
            RMGX=SNDX+RX
            RMGY=SNDY+RY
            RMGZ+SNDZ+RZ
```

CALCULATE BEAM ANGLES

```
      AZID      = DATAN2(RMGY,RMGX) + PI
      DUMMY     = DSQRT(RMGX*RMGX+RMGY*RMGY)
      ELVD      = DATAN2(RMGZ,DUMMY)
      ERAB      = -CA + AZID + XX(7)
      EREB      = ELVD - CEE + XX(8)
      IF( IPR(4) .GT. 0 ) WRITE(3,1020) SX,SY,SZ,
     SNDX,SNDY,SNDZ,RX,RY,RZ
    1,RMGX,RMGY,RMGZ,AZID,ELVD,SRANGE
 1020 FORMAT(1H ,'SX,SY,SZ',3F8.4,'SND(XYZ)',
            3F10.5,'R(XYR)',3F10.5,
    1/1H ,'RMGX,RMGY,RMGZ',3F10.5,'AZID,ELVD',2F8.5,
           'SRANGE',F8.3 )
      RETURN
      END

SUBROUTINE ALIGM(ELP,ALP,SIC,GAM,EREM,ERAM)

SUBROUTINE ALIGM

IMPLICIT DOUBLE PRECISION (A-H,O-Z)
      DIMENSION A(10),B(10)
      COMMON /ERROR/ XX(10)
      COMMON /PRINT/ IPR(20),ICF(3)
      COMMON/DBFIX2/ A14,E1,E2,E3,E4,E5,E6,E7,F1,F2,
                   F3,F4,F5,PI
      IF (IPR(6) .GT. 0 ) WRITE(3,1000)ELP,ALP,SIC,GAM
 1000 FORMAT(1HO,'*** ALGM /ELP,ALP,SIC,GAM',4F12.6)
      DO 100 I = 1,5
      A(I) = DCOS(XX(I+1))
  100 B(I)       = DSIN(XX(I+1))

E COORDINATE SYSTEM - CE error
      G = ((((E6*SIC+E5)*SIC+E4)*SIC+E3)*SIC+E2)
          *SIC+E1
```

```
       IF( ICF(1) .GT. 0 ) G = 0.0D0
       XE        = XX(1)*DSIN(SIC+G)
       YE        = 0.0
       ZE        = -XX(1)*DCOS(SIC+G)

H COORDINATE SYSTEM - BS error
       XH        = XE*A(1) - ZE*B(1)
       YH        = YE + XX(2)
       ZH        = ZE*A(1) + XE*B(1)

D COORDINATE SYSTEM - AH error
       XD = XH + XX(3)
       YD = YH*A(2) - YH*B(2)
       ZD = ZH*A(2) - YH*B(2)

B COORDINATE SYSTEM - GAM rotation
       XB        = XD*DCOS(GAM) = YD*DSIN(GAM)
       YB        = YD*DCOS(GAM) + XD*DSIN(GAM)
       ZB        = ZD A COORDINATE SYSTEM - CR error
       XA        = XB*A(3) + YB*B(3)
       YA        = YB*A(3) - XB*B(3)
       ZA        = ZB + XX(4)

X,Y,Z P COORDINATE SYSTEM - AR error
       XP        = XA + XX(5)
       YP        = YA*A(4) + ZA*B(4)
       ZP        = ZA*A(4) - YA*B(4)

R COORDINATE SYSTEM - BR error
       XR        = XP*A(5) - ZP*B(5)
       YR        = YP + XX(6)
       ZR        = ZP*A(5) + XP*B(5)
       IF( IPR(6) .GT. 0 )WRITE(3,1010) XE,YE,ZE,XH,YH,
          ZH,XD,YD,ZD
```

```
     1          ,XB,YB,ZB,XA,YA,ZA,XP,YP,ZP
     2          ,XR,YR,ZR
  1010 FORMAT(1H ,'XE,YE,ZE=',3F7.4,' XH,YH,ZH=',3F7.4
     1          ,'XD,YD,ZD=',3F7.4,' XB,YB,ZB=',3F7.4
     2  /1H     ,'XA,YA,ZA=',3F7.4,' XP,YP,ZP=',3F7.4
     3          ,'XR,YR,ZR=',3F12.9)

DEMO         = DCOS(ELP)*DCOS(GAM-ALP)
       DEM1         = 2.0*DCOS(SIC+G)**2*DEMO
       DEM3         = DSIN(2.0*(SIC+G))*DEMO

TEMO         = DCOS(ELP)*DSIN(GAM-ALP)
       TEM2         = DSIN(2.0*(SIC+G))*DSIN(ELP)
       TEM3         = DCOS(2.0*(SIC+G))*DEMO
       TEM4         = -DSIN(2.0*(SIC+G))*TEMO
       TEM5         = DCOS(2.0*(SIC+G))*DSIN(ELP)
       TEM6         = (DCOS(SIC+G)*TEMO)**2

V = -DCOS(ELP)*DCOS(ALP)+TEM2*DCOS(GAM)+
           DEM1*DCOS(GAM)

THSI         = 2.0*(TEM2+TEM3)/DCOS(THA)
       THGA         = TEM4/DCOS(THA)
       BESI         = -DCOS(BET)**2*2*TEMO*(TEM5-DEM3)/
                       V**2
       BEGA         = (((TEM2+TEM3)*(TEM2+DEM1)
     1                  + 2.0*TEM6)*DCOS(BET)**2)/V**2

BEAM ERROR EQUATIONS FROM ALIG

DX           = ZR*DCOS(SIC+G)*DSIN(GAM)-
                      YR*DSIN(SIC+G)
       DY           = XR*DSIN(SIC+G)-ZR*DCOS(SIC+G)
                      *DCOS(GAM)
       DZZ          = YR*DCOS(SIC+G)*DCOS(GAM)-
                      XR*DCOS(SIC+G)*DSIN(GAM)
```

```
      IF(IPR(6).GT.0)WRITE(3,1043) DX,DY,DZZ
1043  FORMAT(/' DX,DY,DZZ = ',3F11.7)
   15 CONTINUE
      DGA       = (-DSIN(GAM)*DX + DCOS(GAM*DY)/DCOS
                  (SIC+G)
      DSI       = DZZ /DCOS(SIC+G)
      EREM      = THSI*DSI + THGA*DGA + XX(8)
      ERAM      = BESI*DSI + BEGA*DGA + XX(7)
      IF (IPR(6).GT.0)WRITE(3,1162) THSI,THGA,BESI,
         BEGA,DSI,DGA
1162  FORMAT(/ 'THSI,THGA,BESI,BEGA,DSI,DGA =
              ',6F11.7)
      IF(IPR(6).GT.0)WRITE(3,1160) EREM,ERAM
1160  FORMAT(/' EREM,ERAM = ',F11.7,2X,F11.7)
      RETURN
      END

SUBROUTINE ALGS(ELP,ALP,SIC,GAM,THA,BET,
                     ERES,ERAS,IFR)

THIS ROUTINE CALCULATES THE REFLECTED BEAM
POSITION AND ERROR  BETWEEN THE REFLECTED BEAM AND
AIMPOINT.

INPUTS:
ELP       -SUN AZIMUTH (RADS)
ALP       -SUN ELEVATION (RADS)
GAM       -HELIOSTAT AZIMUTH GIMBAL ANGLE (RADS)
SIC       -HELIOSTAT ELEVATION GIMBAL ANGLE
              (RADS)

OUTPUTS:
BET   -BEAM AZIMUTH DIRECTION (HELIOSTAT REF)
THA   -BEAM ELEVATION DIRECTION (HELIOSTAT REF)
ERAS  -AZIMUTH BEAM ERROR (RADS)
ERES  -ELEVATION BEAM ERROR (RADS)
```

```
       IMPLICIT DOUBLE PRECISION (A-H,O-Z)
       DIMENSION A(10),B(10),XER(10)

COMMON/DBFIX2/ A14,E1,E2,E3,E4,E5,E6,E7,F1,
      1               F2,F3,F4,F5,PI
       COMMON /AIMP/ CA,CEE,GRANGE
       COMMON /DBCAL2/ C5,C6,C7,C8,C9,C10,D4,D5,D6
      1                D7,D8,D9,D10,D11,D12,D13,C11
       COMMON/PRINT/IPR(20)
       COMMON /ERROR/ XX(10)
       COMMON/TRAN1/A,B
       COMMON /HEL/ C,THICK,NER,NAR,AX,AY,AZ,BX,BY,BZ
       COMMON/HELSIM/AZ,BX,CX
       IF( IPR(2) .GT. 0 ) WRITE(3,1000) IFR
 1000 FORMAT(1H0,'*** ALGS '/1H,' IFR',I4)

IF( IFR .GT. 0
    GO TO 100
       DO 60 I=1.10
   60 XER(I)    = 0.0
    GO TO 200
  100 DO 120 I =1,10
  120 XER(I)    = XX(I)
  200 DO 10 I=1,5
       A(I)     = DCOS(XER(I+1))
   10 B(I)      = DSIN(XER(I+1))

S COORDINATE SYSTEM - CE error
   30 XS       = 0.0
       YS       = DSIN(XER(1))
       ZS       = DCOS(XER(1))
              E COORDINATE SYSTEM - SIC rotation
       G = ((((E6*SIC+E5)*SIC+E4)*SIC+E3)*SIC+E2*SIC+E1
       G = 0.0D0
       XE       = ZS*DCOS(SIC+G)
```

```
        YE      = YS
        ZE      = ZS*DSIN(SIC+G)
            Transform vector to inertial reference system.
        CALL TRAN1(XE,YE,ZE,XR,YR,ZR,GAM)
        IF(IFR .GT. 0)
  GO TO 600
        XRL     = XR
        YRL     = YR
        ZRL     = ZR
  GO TO 900
    600 XRD     = XR - XRL
        YRD     = YR - YRL
        ZRD     = ZR - ZRL
        GAML    = DATAN2(YRL,XRL)
        GAMX    = DATAN2(YR,XR)
        SICL    = DARSIN(ZRL)
        SICA    = DARSIN(ZR)
        GAMD    = GAMX - GAML
        SICD    = SICA - SICL
        IF( IPR(7) .GT. 0 ) WRITE(3,1060)
            XRL,YRL,ZRL,XRD,YRD,ZRD,GAML
       1,GAMX,GAMD,SICL,SICA,SICD
   1060 FORMAT(1H,'XRL,YRL,ZRL',3F10.6,'XRD,YRD,
            ZRD',3F10.6
       1/1H ,'GAML,GAMX,GAMD',3F10.6
       2/1H ,'SICL,SICA,SICD',3F10.6)
            Calculate SUN unit vector in inertial reference
            system.
    700 SX = DCOS(ELP)*DCOS(ALP)
        SY = DCOS(ELP)*DSIN(ALP)
        SZ = DSIN(ELP)

Calculate 2 times the angle between sun unit vector mirror
    normal.
```

```
         TCOS2  = 2.0*SX*XR + SY*YR + SZ*ZR)

TX     = -SX+TCOS2*XR
         TY     = -SY+TCOS2*YR
         TZ     = -SZ=TCOS2*ZR
      Calculate the pivot point offset vector.
         RX     = (CX + BX*DCOS(SIC) - AX*DSIN(SIC))
                *DCOS(GAM)
         RY     = RX * DSIN(GAM) /DCOS(GAM)
         RZ     = BX * DSIN(SIC) + AX*DCOS(SIC)
         IF(IPR(2) .GT. 0 ) WRITE(3,1010)
            SX,SY,SZ,TX,TY,TZ,RX,RY,RZ
    1010 FORMAT(1H ,'SX,SY,SZ',3F10.6,'TX,TY,TZ',
              3F10.6,'RX,RY,RZ',3F10.6)
      Transform vector to inertial reference system.
         CALL TRAN1( RX,RY,RZ, HX,HY,HZ,GAM )
         IF(IPR(2) .GT. 0 ) WRITE(3,1020) HX,HY,HZ
    1020 FORMAT(1H ,'HX,HY,HZ',3F10.6 )
      Transform beam vector to aimpoint reference system.
         CALL TRAN2( TX,TY,TZ,TTX,TTY,TTZ, CA - PI )
      Transform pivot point vector to aimpoint reference
      system.
         CALL TRAN2( HX,HY,HZ, HTX,HTY,HTZ, CA-PI )
         IF( IPR(2) .GT. 0 ) WRITE(3,1030)
             TTX,TTY,TTZ,HTX,HYT,HTZ
    1030 FORMAT(1H ,'TTX,TTY,TTZ",3F10.6,'HTX,HTY,
              HTZ",3F10.6
      Calculate scale factor.
         SCA    = ABS((GRANGE - HTX)/TTX)
         XB     = GRANGE
         YB     = HTY + TTY*SCA
         ZB     = HTZ + TTZ*SCA
      Calculate beam error.
         ERAS = DATAN2( YB/XB )
         ERES = DATAN2( ZB , DSQRT(YB**2 + XB**2) ) - CEE
```

```
      IF( IPR(2) .GT. 0 ) WRITE(3,1040) SCA,XB,YB,ZB,
     *     ERAS,ERES
 1040 FORMAT(1H ,'SCA",F12.0,'XB,YB,ZB',3F12.4,
     *      'ERAS,ERES',2F12.8 )
  900 RETURN
      END

SUBROUTINE TRAN1 (XE,YE,ZE,XR,YR,ZR,GAM)
      IMPLICIT DOUBLE PRECISION (A-H,O-Z)
      COMMON/TRAN1/A,B
      COMMON/PRINT/IPR(20)
      DIMENSION A(10),B(10)

C         H COORDINATE SYSTEM - BS error
      XH    = XE*A(1) - ZE*B(1)
      YH    = YE
      ZH    = ZE*A(1) + XE*B(1)

C         D COORDINATE SYSTEM - AH error
      XD    = XH
      YD    = YH*A(2) + ZH*B(2)
      ZD    = ZH*A(2) - YH*B(2)

C         B COORDINATE SYSTEM - GAM rotation
      XB    = XD*DCOS(GAM) - YD*DSIN(GAM)
      YB    = YD*DCOS(GAM) + XD*DSIN(GAM)
      ZB    = ZD C         A COORDINATE SYSTEM - CR error
      XA    = XB*A(3) + YB*B(3)
      YA    = YB*A(3) - XB*B(3)
      ZA    = ZB C         X,Y,Z PRIME COORDINATE SYSTEM
      XP    = XA
      YP    = YA*A(4) + ZA*B(4)
      ZP    = ZA*A(4) - YA*B(4)
```

```
          R COORDINATE SYSTEM - BR error
       XR   = XP*A(5) - ZP*B(5)
       IF( IPR(2) .GT. 0 )WRITE(3,1010) XE,YE,ZE,XH,YH,
           ZH,XD,YD,ZD
      1                    ,XB,YB,ZB,XA,YA,ZA,XP,YP,ZP
      2                    ,XR,YR,ZR
 1010 FORMAT(1HO,'XYZ/E',3F8.5,'XYZ/H',3F8.5
      1                    ,'XYZ?D',3F8.5,'XYZ/B',3F8.5
      2 /H                 ,'XYZ/A',3F8.5,'XYZ/P',3F8.5
      3                    ,'XYZ/R',3F12.9)
       RETURN
       END
       SUBROUTINE TRAN2( X1,Y1,Z1,X2,Y2,Z2, ANG )
       IMPLICIT DOUBLE PRECISION (A-H,O-Z)
       X2   = X1*DCOS(ANG) + Y1*DSIN(ANG)
       Y2   = Y1*DCOS(ANG) + X1*DSIN(ANG)
       Z2   = Z1
       RETURN
       END
                    SUPPORT ROUTINES
  THESE ARE SUBROUTINES CALL BY THE ALIGNMENT ANALYSIS
  PROGRAM.

SUBROUTINE DBDAT(ICOR)
       IMPLICIT DOUBLE PRECISION (A-H-O-Z)
       COMMON/DBFIX1/ A4,A5,A6,A7,A8,A9,A10,A11,A12
      1 A13,A15,A17,B1,B2,B3,B4,B5
       COMMON /DBFIX2/ A14,E1,E2,E3,E4,E5,E6,E7,
                       F1,F2,F3,F4,F5
       COMMON /CON/ CXX,CY,A18,A19,A1
       COMMON /DBFIX4/ A21,A22,A23,A24
       COMMON /DBCAL2/ C5,C6,C7,C8,C9,D1,C10,D4,D5,D6,
                       D7,D8,D9,D10,D11
      1,D12,D13,C11,PI
       COMMON /HEL/ AX,BX,CX,AX1,BX1,CX1
       COMMON /AIMP/ CA,CEE,GRANGE
```

```
      COMMON /ERROR/ XX(10)
      COMMON/D123/DE1,DE2,DE3
      COMMON/PRINT/IPR(20),ICF(3)
      DATA A1/7.1006019D0/,A18/.5730726D0/,
     5    A19/.8195046D0/
      SUN ELEVATION AND AZIMUTH ANGLE CONSTANTS
      DATA A4/6.2297615D0/, A5/.00071674874D0/,
          A6/4.8720754D0/
     1    A7/0.00071678297D0/, A8/.033380469D0 /,
          A9/0.000377515D0/
     2,   A10/0.409143225D0/,  A11/0.25907058D-9/,
          A12/.26179939D0/
     3,   A13/0.05D0/, A14/0.2D0 ,A15/1.7399359D0/
     4,   A17/0.87918216D-17/,A21/0.0002441406D0/,
          A22/0.08976D0 /
     5,   A23/11.1408D0/, A24/200.0D0/

REFRACTION CORRECTION CONSTANTS
      DATA B1/-9.036938093D-5/,B2/-1.600076095D-5/,
          B3/2.948324656D-4/
     1,   B4/-3.278909000D-8/, B5/-1.234081940D-8/

GRAVITATIONAL CORRECTION CONSTANTS
      DATA E1/0.D0/,E2/.00357052D0/,E3/-.00750968D0/,
          E4/.0121311D0/
     1,E5/-.00801586D0/,E6/.00183415D0/

HELIOSTAT OFFSET CONSTANTS
      DATA E7/897.893D0/
      JACK TRANSFER CONSTANTS
      DATA F2/12491.59698D0/,F3/0.1705025D0/,
          F4/1.033782D0/
     1,      F5/-6884.0D0/
        PI=3.141592654D0
      NER = 13736.84
```

```
      TILT AND NON-ORTHOGONALITY CALCULATIONS
      DE1  = DATAN2( SIN(XX(6))*COS(XX(5)),SIN(XX(5)))
      IF( XX(5)*XX(670 .EQ. 0.0 ) DE1 = 0.0D0
  100 DE2  = DARSIN( -DSIN(DE1)*DSIN(XX(6))
             /DCOS(XX(5))
     1       - DSIN(XX(5))*DCOS(DE1)
     2       + DSIN(DE1)*DTAN(XX(5))*DSIN(XX(5))
              *DSIN(XX(6)) )
      DE3  = 0.0
      WRITE(6,1000) DE1,DE2,DE3
 1000 FORMAT(1H ,'DE1',F11.6,'DE2',F11.6,'DE3',F11.6 )
      AX   = 0.0D0
      BX   = 2.25D0
      CX   = 0.958333D0
      AX1  - 0.0D0
      BX1  = 2.25D0
      CX1  = 0.958333D0
      IF( ICF(3) .EQ. 0 )
   GO TO 120
      AX   = 0.0D0
      BX   = 0.D0
      CX   = 0.0D0
      AX1  = 0.0D0
      BX1  = 0.0D0
      CX1  = 0.0D0
  120 C    = CX1
      IF( CX1 .EQ. 0.0 ) C = 0.00001
      D1   = 0.0
      D2   = 0.0
      D3   = 0.0
      IF( ICOR .EQ. 0 )
   GO TO 200
      D1   = DE1
      D2   = DE2
      D3   = DE3
```

```
  200 C5   = DCOS(CEE)*DSIN(CA)
      C6   = DCOS(CEE)*DCOS(CA)
      C7   = GRANGE/C
      C8   = DTAN(CEE)
      C9   = (C/GRANGE)**2+1
      C10  = 2*C/GRANGE
      C11=C8**2+C9

D4=DCOS(D1)
      D5=DSIN(D1)
      D6=DSIN(D2)
      D7=DCOS(D2)
      D8=DSIN(D1)*DCOS(D2)
      D9=DCOS(D2)*DCOS(D1)
      D10=DSIN(D2)*DSIN(D1)
      D11=DSIN(D2)*DCOS(D1)
      D12=DCOS(D3)
      D13=DTAN(D3)
      RETURN
      END

SUBROUTINE SPOS(TC,ELER,AZIM)
      IMPLICIT DOUBLE PRECISION (A-H,O-Z)
      REAL JCENT
      COMMON /DBFIX1/ A4,A5,A6,A7,A8,A9,A10,A11,A12,
     1 A13,A15,A17,B1,B2,B3,B4,B5
      COMMON /CON/ CX,CY,A18,A19,A1
      COMMON/PRINT/IPR(20),ICF(3)
      DIFF24=CX+TC
      JCENT=CY
      GSTOH=A15+A7*JCENT+A17*(JCENT**2)
      ANGCR=A4+A5*DIFF24
      ECLL=(A6+A7*DIFF24+A8*DSIN(ANGCR)+A9*DSIN
           (2*ANGCR))
      ECLO=(A10-A11*DIFF24)
      RTAS=DATAN2(DSIN(ECLL)*DCOS(ECLO),DCOS(ECLL))
```

```
      SLSE=DSIN(ECLL)*DSIN(ECLO)
      DECL=DATAN2( SLSE,DSORT(1.0-SLSE**2))
      TMCR=A12*(1.0027379093*TC-A1
      HANG=GSTOH+TMCR-RTAS
      ELEV=DARSIN(A18*DSIN(DECL)+DCOS(DECL)*DCOS
          (HANG)*A19)
      IF(ELEV.LT.A13)ELEV=A13
      AZIM=-DATAN2(DSIN(HANG),(DCOS(HANG)*A18-DTAN
          (DECL)*A19))
      RC=B1*(ELEV)+B2+B3*(1/ELEV)+B4*((1/ELEV)**2)+B5*
          ((1/ELEV)**3)
      ELER=ELEV+RC
      T1 = ELER
      DEGR=180.0/3.141592654
      T1=T1*DEGR
      T2=AZIM*DEGR
      IED=T1
      IEM=ABS(T1-IED)*60.0
      TES=ABS(T1-IED)*3600.0-IEM*60
      IAD=T2
      IAM=ABS(T2-IAD)*60.0
      TAS=ABS(T2-IAD)*3600.0-IAM*60.0
  200 FORMAT(1H0,'TIME=',F10.6,' ELEV=',F10.6,' (',I4,
          'D',I3,'M',F6.2,
     1,'S)   AZIM=',F10.6,'(',I4,'D',I3,'M',F6.2,'S )' )
      IF(IPR(3) .GT. 0) WRITE(6,200)  TC,ELEV,IED,
          IEM,TES,AZIM,IAD,
     1 IAM,TAS
      IF(IPR(3) .GT. 0) WRITE(6,210) ANGCR,ECLL,ECLO,
          RTAS,DECL,HANG
  210 FORMAT(1H ,' ANGCR,ECLL,ECLO,RTAS,DECL,HANG
          =',6E16.9)
      RETURN
      END
      SUBROUTINE CXCY( IYEAR, MONTH, IDAY )
      IMPLICIT INTEGER*2 (I-N)
```

```
      IMPLICIT DOUBLE PRECISION (A-H,O-Z)
      DOUBLE PRECISION XJUDAT,JD1958,JD1900,JD
      COMMON /CON    /CX,CY,A18,A19,A1

C     TIME VARIABLES WERE CONVERTED FROM INTEGER*4 TO REAL
C     FOR PDP
C     JULIAN DATE VARIABLES WERE MADE DOUBLE PRECISION REAL

C          ARITHMETIC STATEMENT FUNCTION
      RNAINT( X ) = AINT( X + 0.5 )

DATA JD1958/2436203.5D0/,JD1900/2415020.0D0/

C     THE FOLLOWING THREE STATEMENTS WOULD BE VALID IF
C     32-BIT INTEGER CALCULATIONS WERE PERMISSIBLE.
++        JD  =IDAY+1461*(IYEAR+4800+(MONTH-14)/12)/4
++   1        +367*(MONTH-2-(MONTH-14)/12*12)/12
++        JD  = JD-32075-3*((IYEAR+4900+(MONTH-14)
                /12)/100)/4

FJD2 = RNAINT( FLOAT( IYEAR+4800+
             (MONTH-14)/12 ) )
      FJD3 = 367*(MONTH-2-(MONTH-14)/12*12/12
      FJD4 = RNAINT( FLOAT( (IYEAR+4900+
             (MONTH-14)/12)/100 ) )
      TYPE 8020, FJD2,FJD3,FJD4
 8020      FORMAT (' FJD2, FJD3, FJD4 = ',3G16.8)
      JD  = IDAY + RNAINT(1461.*FJD2/4) + FJD3
      JD  = JD - 32075. - RNAINT(3.FJD4/4.)
      XJUDAT = JD - 0.5D0
      CX=24.*(XJUDAT-JD1958)
      CY=24.*(XJUDAT-JD1900)
      WRITE(6,6) IYEAR,MONTH,IDAY,JD,XJUDAT,CX,CY
    6 FORMAT(1H ,'YYYY.MM.DD=',I4,2(1H.,I2),' JD=
             'D17.9,' XJUDAT='D17.9,
```

```
                    / 4X,' CX=' F10.0, 'CY=' F10.0)
      RETURN
      END

FUNCTION TAN( A )

*     SUBROUTINE TO CALCULATE THE TANGENT OF AN ANGLE
      USING THE LIBRARY
*     SINE AND COSINE ROUTINES.
*
      TAN = SIN(A) / COS(A)
      RETURN
      END
      FUNCTION ARCOS( X )
*
*     FUNCTION SUBPROGRAM TO CALCULATE THE ARCOSINE
      USING THE LIBRARY
*     ARCSINE ROUTINE 'ARSIN' FROM THE HAC LIBRARY.
      ARCOS = ARSIN( -X ) + 1.5707963
      RETURN
      END
      FUNCTION ARSIN(SINANG)

GIVEN SINE OF AN ANGLE, ARSIN RETURNS THE ANGLE IN
      RADIANS UTILIZING LIBRARY FUNCTION, ATAN

DATA PI2/ 1.57079633/
      COSANG = SQRT(1. - SINANG**2)

CHECK FOR 90 DEGREE ANGLE

IF (.NOT.(COSANG .EQ. 0.)) GO TO 100
         THEN
         ARSIN = SIGN(PI2,SINANG)
         GO TO 200
      C  ELSE
```

```
100     ARSIN = ATAN(SINANG/ COSANG)
        ENDIF
200     RETURN
        END
        DOUBLE PRECISION FUNCTION DTAN( A )
*
*       SUBROUTINE TO CALCULATE THE TANGENT OF AN ANGLE
        USING THE LIBRARY
*       SINE AND COSINE ROUTINES.
*
        DOUBLE PRECISION A
        DTAN = DSIN(A) /DCOS(A)
        RETURN
        END
        DOUBLE PRECISION FUNCTION DARCOS( X )
*
*       FUNCTION SUBPROGRAM TO CALCULATE THE ARCOSINE
        USING THE LIBRARY
*       ARCSINE ROUTINE 'ARSIN' FROM THE HAC LIBRARY.
        DOUBLE PRECISION X
        DARCOS = DARSIN( -X ) + 1.570796327D0
        RETURN
        END
        DOUBLE PRECISION FUNCTION DARSIN(SINANG)

GIVEN SINE OF AN ANGLE, ARSIN RETURNS THE ANGLE IN
        RADIANS UTILIZING LIBRARY FUNCTION, ATAN

DOUBLE PRECISION SINANG,PI2,COSANG
        DATA PI2/ 1.570796327D0/
        COSANG = DSORT(1.D0 - SINANG**2)

- CHECK FOR 90 DEGREE ANGLE
```

```
    IF (.NOT.(COSANG .EQ. 0.)) GO TO 100
        THEN
        DARSIN = DSIGN(PI2,SINANG)
    GO TO 200
C       ELSE
    100     DARSIN = DATAN(SINANG/ COSANG)
        ENDIF
    200 RETURN
    END
```

It can readily be seen that there is provided by this invention a unique and novel method of automatically aligning a multitude of heliostats in a field by systematically determining errors in the sun bean position and correlating these errors to the heliostats alignment coefficients. Using this technique, the alignment of heliostats that my be changed after the initial alignment may be checked and the heliostats automatically adjusted to correct for any errors.

Although there have been illustrated and described specific structure, it is clearly understood that the same were merely for purposes of illustration and that changes and modifications may be readily made therein by those skilled in the art without departing from the spirit and the scope of this invention.

What I claim is:

It can readily be seen that there is provided by this invention a unique and novel method of automatically aligning a multitude of heliostats in a field by systematically determining errors in the sun bean position and correlating these errors to the heliostats alignment coefficients. Using this technique, the alignment of heliostats that my be changed after the initial alignment may be checked and the heliostats automatically adjusted to correct for any errors.

Although there have been illustrated and described specific structure, it is clearly understood that the same were merely for purposes of illustration and that changes and modifications may be readily made therein by those skilled in the art without departing from the spirit and the scope of this invention.

What I claim is:

1. A heliostat track alignment method, comprising the steps of:
   a. Commanding a sunbeam centroid to a target location to establish a reference position;
   b. Searching for the actual sunbeam centroid position;
   c. Determining the sunbeam centroid position error;
   d. Analyzing the sunbeam centroid position error to correlate the sunbeam centroid position error to errors in a heliostat reference system;
   e. Changing the heliostat reference system to correct for track misalignment to establish a revised heliostat reference system; and
   f. Adjusting the heliostat track alignment to a new position based on the revised heliostat reference system to correct the track misalignment.

2. A heliostat tract alignment method as recited in claim 1 wherein determining the sunbeam centroid position error generally consists of detecting the sunbeam centroid on the reference target utilizing a digital image radiometer to determine the actual sunbeam centroid position and comparing the actual sunbeam centroid position to the reference position.

3. A heliostat track alignment method as recited in claim 1 wherein analyzing the sunbeam centroid position error generally consists of the steps of:
   a. Transforming the sunbeam centroid position errors to heliostat reference system errors;
   b. Transforming the heliostat reference system errors to command reference differential errors; and
   c. Transforming the command reference differential errors to gimbal angle errors; and
   d. Transforming gimbal angle errors to alignment errors.

4. A control system for automatically monitoring and correcting heliostat track alignment errors in a heliostat reference system, comprising:
   a. A heliostat control means connected to a multitude of heliostats for selectively controlling the position of the heliostats;
   b. A memory means for storing the track alignment reference data for the multitude of heliostats; and
   c. A central control means connected to the heliostat control means for automatically selecting a heliostat to be supervised, comparing its track alignment data to the track alignment reference data stored in the memory means, and commanding the heliostat control means to reposition the heliostat to correct for alignment errors.

5. A control system as recited in claim 4, wherein the central control means determines the deviations between the heliostat's sunbeam position and the reference position stored in the memory means, analyzes the sunbeam centroid position error to correlate the deviations to errors in the heliostat track alignment system, and revises the track alignment data for the heliostat reference system.

* * * * *

UNITED STATES PATENT AND TRADEMARK OFFICE
CERTIFICATE OF CORRECTION

PATENT NO. : 4,564,275
DATED : 14 January 1986
INVENTOR(S) : Kenneth W. Stone

It is certified that error appears in the above—identified patent and that said Letters Patent is hereby corrected as shown below:

In column 2, line 39, [33,668] should be 333,668.

In column 4, line 61, [F] should be $\hat{\underline{F}}$.

Signed and Sealed this

Tenth Day of August, 1993

Attest:

MICHAEL K. KIRK

Attesting Officer

Acting Commissioner of Patents and Trademarks